June 23, 1953
R. JACKSON
2,643,013
LOAD SUPPORTING AND CLAMPING ARMS FOR HAND TRUCKS WITH TILTABLE CARRIER FRAMES
Filed Oct. 8, 1951
4 Sheets-Sheet 4
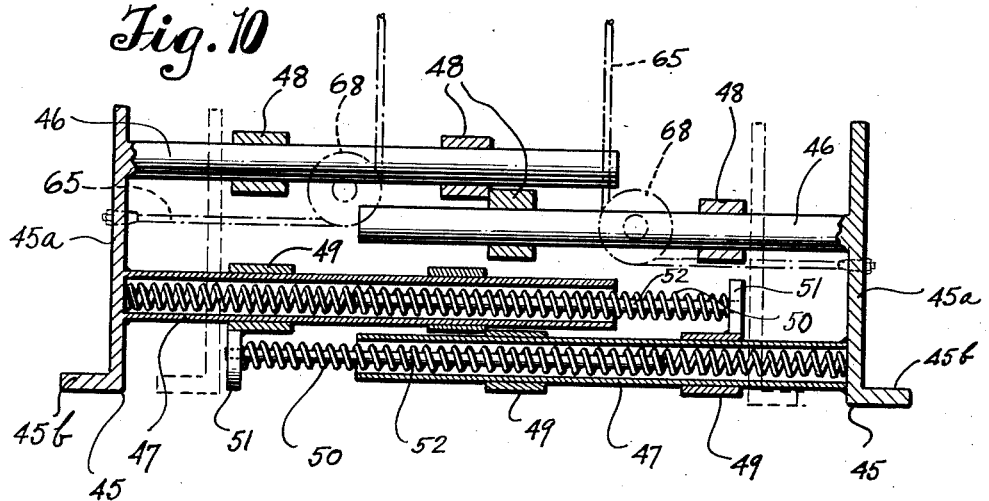
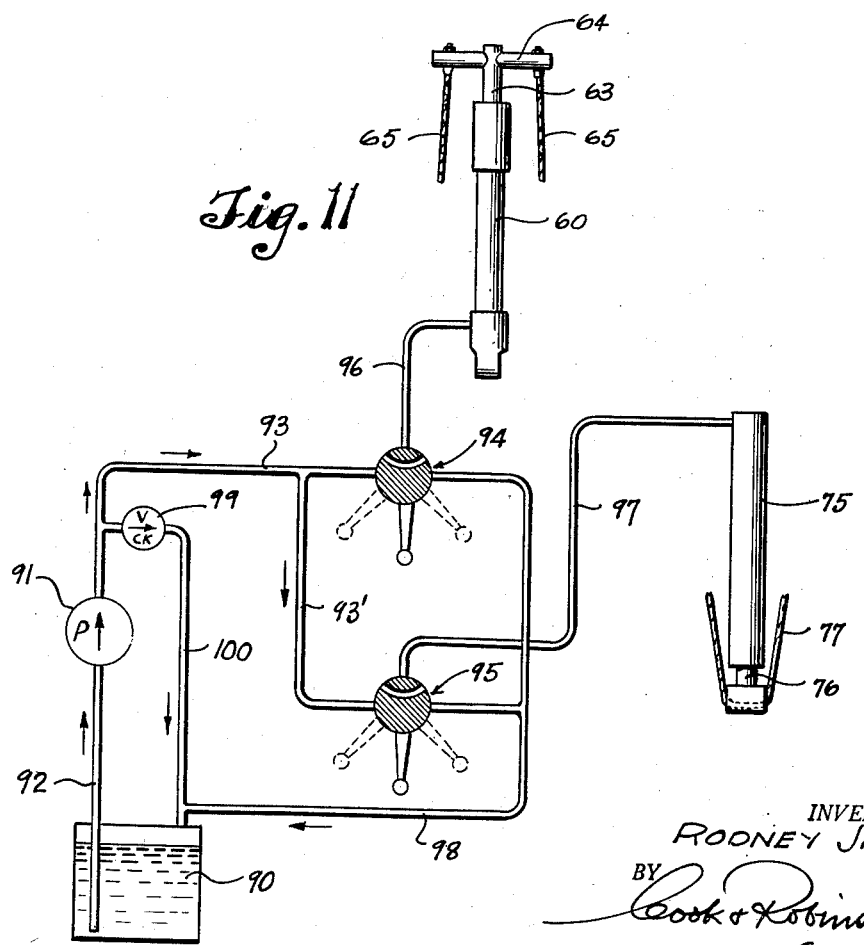
INVENTOR.
RODNEY JACKSON
BY
Cook & Robinson
ATTORNEYS Patented June 23, 1953

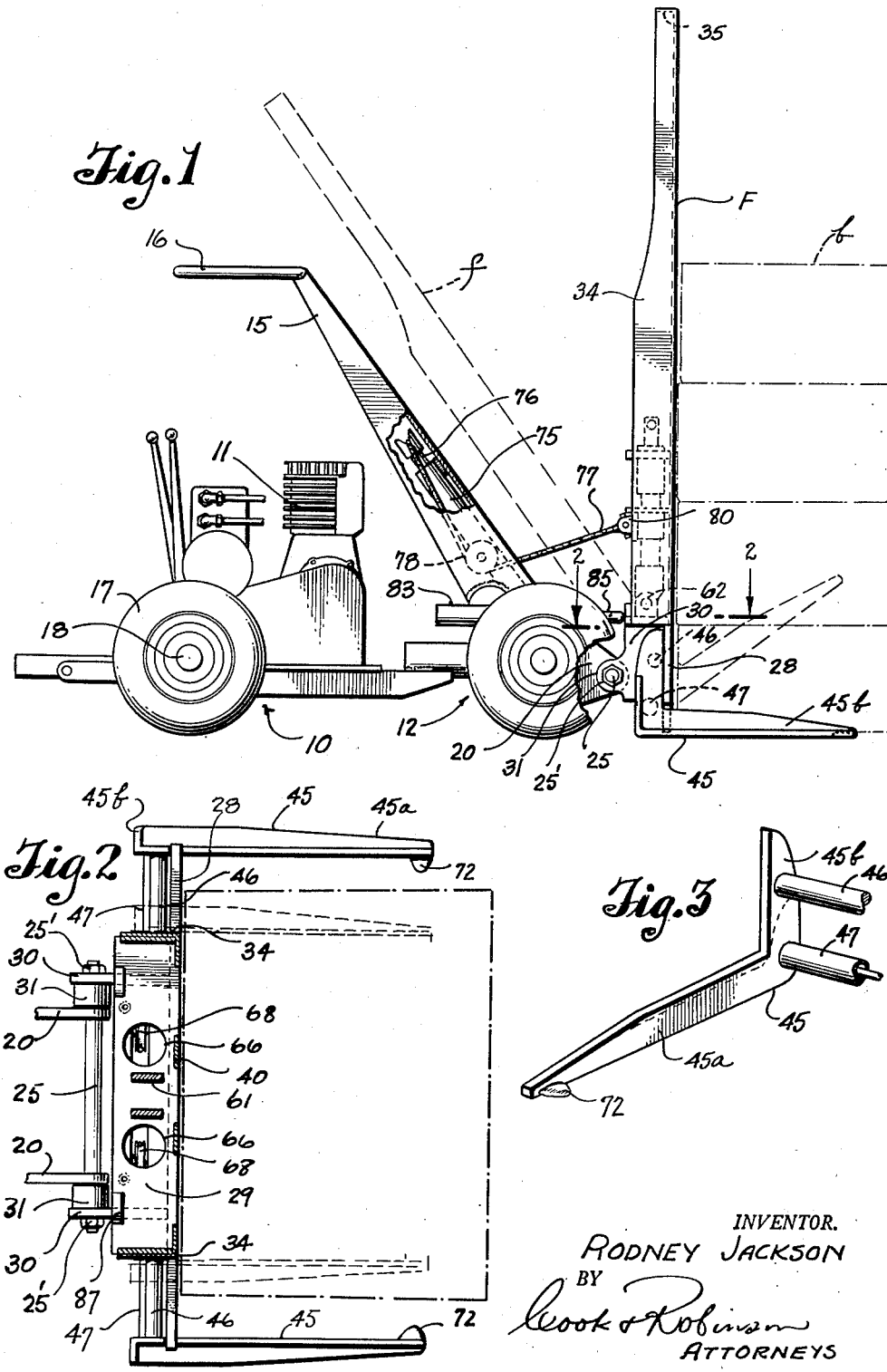

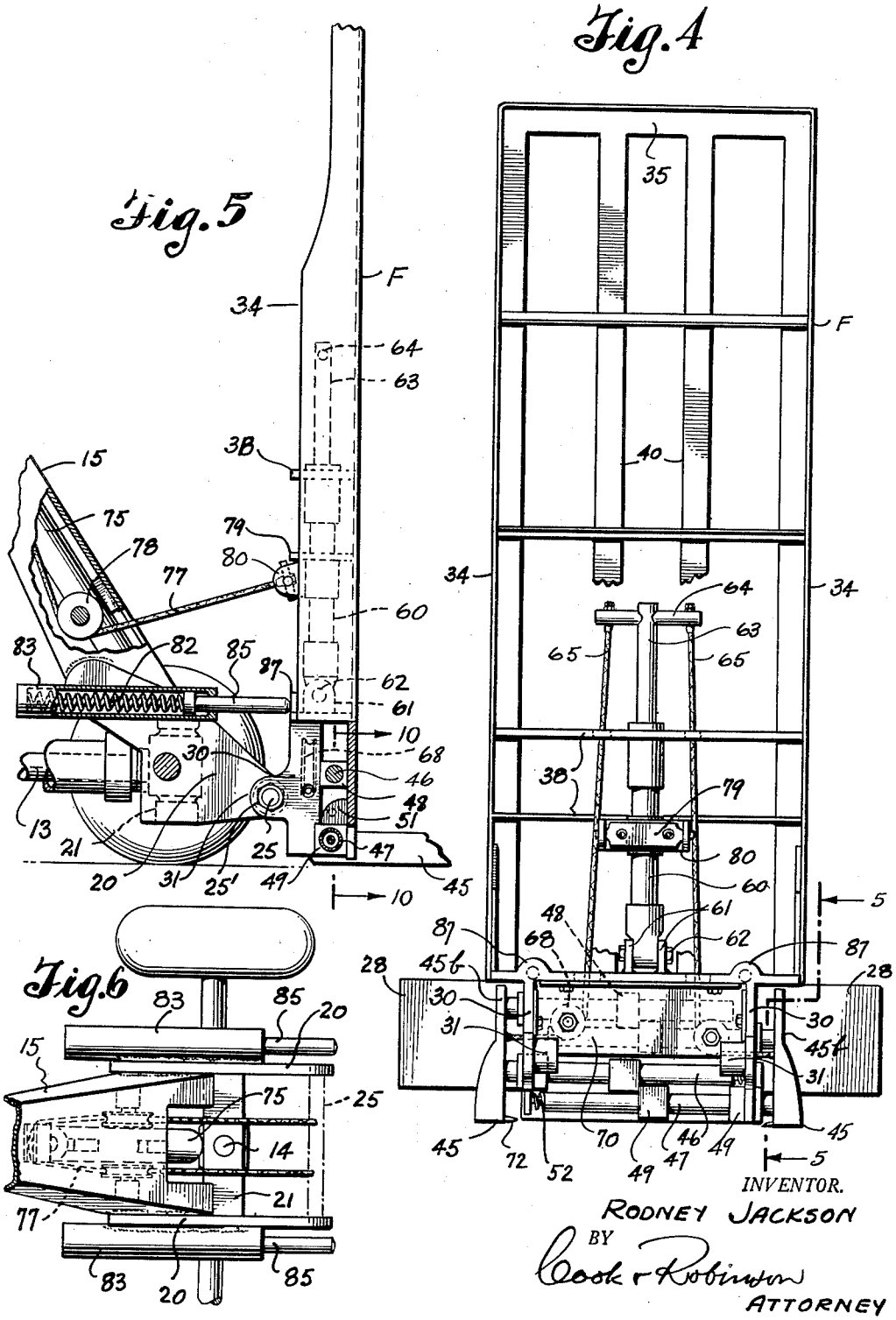

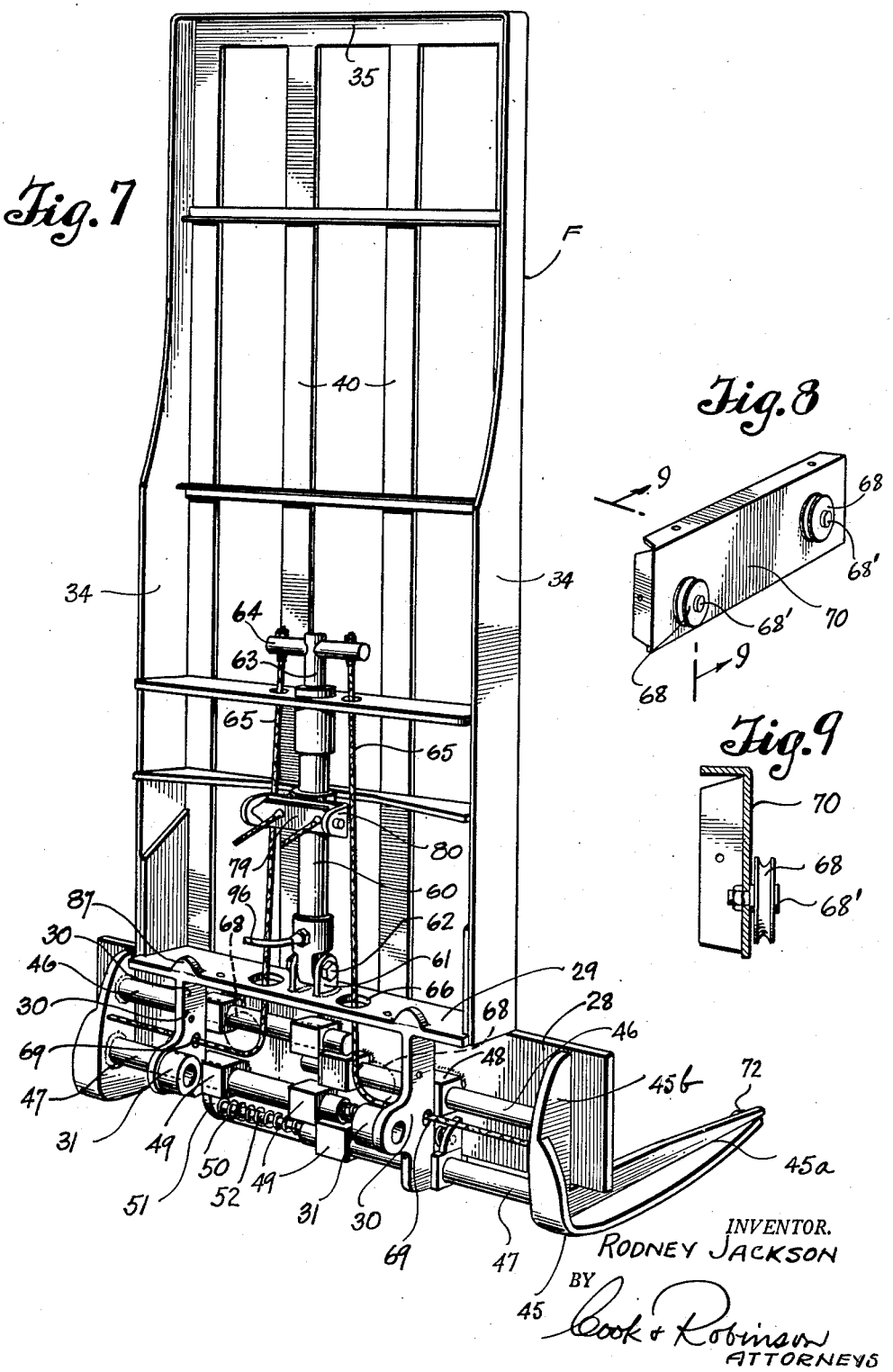

2,643,013

UNITED STATES PATENT OFFICE 2,643,013

LOAD SUPPORTING AND CLAMPING ARMS FOR HAND TRUCKS WITH TILTABLE CARRIER FRAMES

Rodney Jackson, Seattle, Wash., assignor to
Paul J. Isaacson and F. T. Isaacson

Application October 8, 1951, Serial No. 250,254

5 Claims. (Cl. 214—147)

This invention relates to motorized hand trucks. More particularly it relates to improvements in trucks of the character of that which has been described and illustrated in my copending application filed on July 27, 1951, under Ser. No. 238,893, wherein the truck is described and illustrated as having a chassis comprising articulated front end and rear end sections, with a load carrier frame tiltably mounted on the front end section that can be adjusted between an upright loading position and a rearwardly inclined load transporting position, at which latter position it supports the load thereon substantially balanced over the supporting axle of the front end sections.

It is the principal object of this invention to provide a motorized hand truck of the same general character as that above described, and to provide the tiltable load carrier frame with a pair of co-acting clamping arms arranged thereon for the easy pick-up of a stack of boxes from a floor, and its support for transportation.

It is also an object of the invention to provide hydraulic means for the closing together and holding of the clamping arms in supporting contact with the lifted boxes.

More specifically stated, the objects and advantages of the present invention reside in the provision for use on a motorized hand truck, of a pick-up and carrying frame for stacked boxes, which is characterized by use thereon of coacting clamping arms arranged to engage against the opposite ends of the lower box of a stack for the lifting and supporting of the stack for transportation, and which arms are equipped with means for their adjustment to clamping position by a hydraulic jack.

In accomplishing the above mentioned and other objects of the invention, I have provided the improved details of construction, the preferred forms of which are illustrated in the accompanying drawings, wherein—

Fig. 1 is a side view of a motorized hand truck having a tiltable load carrier frame equipped with load lifting and holding arms and an operating mechanism therefor, in accordance with the present invention.

Fig. 2 is a horizontal section, taken on the line 2—2 in Fig. 1, showing the load clamping and pick-up arms.

Fig. 3 is a perspective view of one of the stack or box pick-up arms.

Fig. 4 is a rear elevation of the load carrier frame and load pick-up arms, and showing the arm clamping jack and cable connections with the arms.

Fig. 5 is a side view of the same, with parts thereof shown in section as seen on the line 5—5 in Fig. 4.

Fig. 6 is a plan view of the steerable front end section of the truck.

Fig. 7 is a perspective view of the load carrier frame and load pick-up arms, as seen from rearwardly thereof.

Fig. 8 is a perspective view of the cable guide sheaves and their mounting plate.

Fig. 9 is a cross-section of the plate taken in the plane of line 9—9 in Fig. 8.

Fig. 10 is an enlarged sectional detail, taken on line 10—10 in Fig. 5.

Fig. 11 is a diagrammatic illustration of the hydraulic power system for controlling the movements of the load carrier frame and clamping arms.

Referring more in detail to the drawings—

In accordance with the previous statement of the character of the present truck, it is shown in Fig. 1 to comprise a rear end section 10, supporting an engine 11 and its control devices, and a front end steering and load supporting section that is designated in its entirety by numeral 12; this latter section being pivotally connected to the rear section through the mediacy of a horizontal and longitudinally extending swivel shaft 13, shown in Fig. 5, and vertically aligned pivots 14 at the forward end of the swivel shaft as shown in Fig. 6. The front end section also is equipped with an upwardly and rearwardly inclined steering column 15 with horizontal handle portion 16 at its upper end.

The truck sections 10 and 12 are both wheel supported; the wheels 17 of the rear section being driven by the engine 11 through their mounting axle 18; this driving connection and direction controls not being shown or described herein.

The front end section 12 comprises a frame structure which is shown in Fig. 6 to comprise vertically disposed, laterally spaced opposite side plates 20—20, rigidly joined at their medial points by vertically spaced, horizontal crossbars 21—21. The articulating connection between the two sections provides that the forward end of the swivel shaft 13 is contained between the bars 21—21 and mounts the vertical pivots 14 which in turn are rotatably fitted in holes provided for them in the bars.

The forward end portions of the side plates 20—20 support a cross-shaft 25 therebetween, and it is on the opposite end of this shaft that the load carrier frame, designated in its entirety by reference character F, is supported for movement from the upright position in which it is shown in Fig. 1, to the rearwardly inclined load transporting position, indicated in dotted lines at f in the same view. The rearward inclining of the load carrier frame operates to lift a load that has been engaged, and place it in a position substantially balanced over the front wheel axles.

The gist of the present invention resides in the application of load pick-up arms to the lower end of the carrier frame, and means for their actuation, whereby they can be clamped tightly against the opposite ends of the lower box in a stack of boxes, so that incident to tilting the carrier frame rearwardly, the stack will be raised and disposed in a substantially balanced and safe handling position over the wheel axle.

Referring more particularly to Figs. 4 and 7, it is observed that the load carrier frame F includes a lower end frame structure comprising a vertically disposed, and transversely directed cross plate 28 of substantial strength and rigidity and extended to the full width of the front wheels of the truck. Rigidly fixed to this plate, along its top edge, is a horizontal plate 29 that extends in a rearward direction at a right angle to the plane of plate 28, and terminates short of the ends of plate 28. Secured rigidly to the back side of plate 28, and also to the plate 29, are vertically extending webs, or flanges 30—30, and these have transversely aligned bearings 31—31 formed therein which pivotally contain the opposite end portions of the cross-shaft 25 therein, as clearly shown in Fig. 5, for the pivotal support and tilting action of the load carrier frame. The shaft 25 is equipped with nuts 25' at its ends to hold it against endwise movement.

Erected upon the lower end frame structure of the load carrier, is an elongated, rectangular main frame structure. This comprises upright opposite side beams 34—34, of angle iron form, joined across their upper ends by a cross-beam 35, and secured at their lower ends by welding or otherwise, to the opposite ends of the horizontal plate 29 as has been shown in Fig. 7. The forward flanges of the side beams of this frame are flush with the front surface of plate 28. This upper frame structure is braced by vertically spaced cross webs 38 and longitudinal straps 40. As so constructed, the load carrier frame structure is rigid and substantial and swings easily on cross shaft 25.

For the pick-up of a stack of boxes, for example, a stack of the character indicated in dotted lines at b in Fig. 1, the stack is approached by the truck in a manner to bring the front face of the load carrier frame flatly against a side of the stack. To lift and support the stack, there is provided two co-acting clamping arms 45—45, that extend forwardly from beneath the opposite end portions of the plate 28. Each clamp arm is of the angular form of that shown in Fig. 3, in that it comprises an elongated horizontal portion 45a and a relatively short upright leg 45b at its inner ends. Each arm is supported and guided in its adjustments, by two parallel horizontal shafts 46 and 47 that have their outer ends rigidly fixed to the upright leg portion thereof as shown in Figs. 7 and 10. These shafts extend in a direction transversely of the truck, the upper shafts being slidably contained in two laterally spaced bearing blocks 48 that are fixed to the back side of the plate 28. The lower shafts are tubular and are open at their inner ends. They are slidably contained in two laterally spaced bearing blocks 49 that are fixed to the back side of the plate 28. The laterally spaced relationship of the opposedly related clamp arms 45—45 is shown in Figs. 2 and 10, and their extent of adjustment is indicated by their full line and dotted line showing in these views.

Contained in each of the tubular shafts is a coiled spring 50 which extends beyond the open end of the shaft to seat against a projecting lug 51 on the adjacent guide blocks 49. The springs are held under compression and constantly urge the clamping arms toward their outer limits of adjustment. Rods 52 contained in the springs and fixed to the lugs 51 as noted in Fig. 10, retain the position of the springs.

Assuming that the arms have been adjusted to their maximum spacing, and that the truck has been so positioned relative to the stack of boxes that the arms extend along opposite ends of the lower box of the stack as in Fig. 2, the next step is to clamp them against the box ends. To accomplish this, I have provided a hydraulic jack which has been well shown in Figs. 4 and 7. The jack is disposed at the back side of the load carrier frame and is rigidly fixed thereto in its central vertical plane. The jack comprises a cylinder 60 that is fixed at its lower end between upstanding ears 61 on the plate 29 by a bolt 62. The upper end of the cylinder is passed through and is rigidly secured in a cross web 38 of the frame F. Extended from the upper end of cylinder 60, is a piston rod 63 and at its upper end is a cross arm 64. Cables 65—65 are attached to opposite ends of the cross arm, and extend downwardly therefrom, through holes 66 in the plate 29, and then beneath sheaves 68—68, through holes 69 in the web 30—30 and are attached at their ends to the upright leg portions of the arms 45.

The sheaves 68—68 are mounted by studs 68' fixed in a plate 70 that is fixed in the lower structure of the carrier frame as shown in Fig. 4; the plate being flanged and bolted through the flanges thereof to the plate 29 and webs 30—30.

When a hydraulic pressure medium is admitted into the lower end of the cylinder, the piston rod is actuated upwardly and this, through the mediacy of the cables, 65—65 pulls the clamp arms 45—45 inwardly against the ends of the box where they will be tightly held as long as the force of pressure medium is retained. When the pressure is released, as presently explained, the springs 50—50 operate to move the arms apart to disengage the stack.

It is shown on Figs. 2 and 3 that the clamp arms are equipped at their outer ends with inwardly extending toes 72 designed to extend beneath the edge of the clamped box so that it cannot slip downward from the clamp while being lifted or transported. These toes will enter beneath the box when the clamps are drawn together by reason of the fact that the arms rest flatly against the lower surface of the box when the carrier frame is in upright position. For the purpose of tilting, or rearwardly inclining the load carrier frame after the arms 45—45 have been clamped against the box, for the stack lifting purposes, I employ a hydraulic jack that is rigidly fixed in the steering column. This jack comprises a hydraulic cylinder 75, fixed in an upwardly extended position, and having a piston rod 76 extended from its upper end. A cable 77 is attached at a medial point to the upper end of the rod and its opposite end portions are extended downwardly along opposite sides of the cylinder, about sheave wheels 78—78, then forwardly and are attached to a plate 79 that is pivoted in a yoke 80 fixed to the jack cylinder 60. When pressure medium is applied to the lower end of jack cylinder 75, the piston rod is extended and the cable pulls the frame F to a rearwardly inclined position in accordance with the extent of movement of the piston. The frame will be held at any position by reason of two coiled springs 82—82 contained in guide tubes 83—83 fixed to the plates 20—20 as shown in Fig. 6. Rods 85, slidable in the tubes extend from the tubes into contact in the lugs 87 on cross plate 29. The springs maintain constant pressure on the rods, as will be understood by reference to showing in Fig. 5.

The means for control of the hydraulic jacks is shown in Fig. 11 wherein a source of hydraulic pressure medium is designated at 90. A pump 91, with its intake side connected to the supply by pipe 92, operates to deliver the medium under pressure through pipe lines 93—93' to valves 94 and 95. Valve 94 controls delivery of the medium to and from jack cylinder 60 through a pipe line 96. Valve 95 likewise controls delivery to and from jack cylinder 75 through a pipe 97. Return flow from the cylinders is through their respective control valves and a pipe line 98 that leads back to source of supply 90. When the valves are closed against return flow from the jack cylinders, the adjustment of frame F or the clamp arms will be retained. When the valves are closed, the pressure medium as circulated by the pump is forced past a pressure relief valve 99 to a return pipe 100.

With the truck so constructed, and the carrier frame F so mounted thereon, the operator can easily, from the operator's position, control the action of the frame F and the clamping action of the arms 45—45. Stacks of boxes can be easily engaged, lifted, and transported. Likewise they can be readily unloaded.

Having thus described my invention, what I claim as new therein and desire to secure by Letters Patent is:

1. In a truck of the character described; a chassis comprising a steerable front end section, a cross-shaft supported thereby at its forward end, a load carrier frame hingedly supported by said cross-shaft for adjustment thereon between a substantially upright load pick-up position and a rearwardly reclining load transporting position over the steerable front end section, arm mounting means adjustably supported by the load carrier frame at its lower end, clamping arms rigidly fixed to said arm mounting means and extended, in cooperating relationship, forwardly of the load carrier frame, power operated means on the load carrier frame for adjusting said arm mounting means to move the arms into clamping contact with an object received between them for lifting and supporting it for transportation, power operated means on the said steerable front end section for tilting the load carrier frame from upright to a reclining position of support on said front end section with an object held between said arms, spring means for actuating the load carrier frame from reclining to upright position upon the de-energization of the second mentioned powered means and spring means for moving the clamping arms apart upon de-energization of the first mentioned powered means.

2. A wheel supported truck of the character described comprising a chassis having a rear end section and a steerable front end section, a steering column fixed rigidly to and extended upwardly and rearwardly from the said front end section for steering the truck, a cross-shaft mounted in the said front end section at the front end thereof, a load carrier frame hingedly supported on said shaft for tilting adjustment between an upright loading position to a rearwardly inclined position of support by and over the said front end section, two pairs of shafts longitudinally slidably mounted in the load carrier frame, near its lower end and extended, respectively, to opposite sides of the said frame, load pick-up arms rigidly mounted on the outer ends of the paired shafts for the reception of a stack of articles between them, spring means acting against shafts of the two pairs to urge the arms apart, hydraulic means mounted in the carrier frame and operable to move the pairs of shafts to adjust the arms toward each other and into clamping contact with a stack as received between them for loading, a source of supply of hydraulic pressure medium, a hydraulic means mounted in the steering column and connected with said source of supply of hydraulic pressure medium, and operatively connected with the carrier frame to move it from upright to reclining position, and spring means on the said front end section serving as a resilient stop and support for the inclined frame and operable against the carrier frame to move it from reclining to upright position when the said hydraulic means is de-energized.

3. A combination as recited in claim 2 wherein one shaft of each of said two pairs of shafts is tubular and open at its inner end and the said spring means acting against shafts of the two pairs to urge the arms apart comprise coiled springs that are confined under compression in the tubular shafts, each with one end thereof extended from the open end of the shaft into abutment with a stop that is fixed to the load carrier frame.

4. A combination as recited in claim 2 wherein the said means on the front end section serving as a resilient stop and support for the inclined frame comprises tubular guides fixed horizontally in the steerable section of the chassis, push rods slidably contained in the tubular guides and extended forwardly therefrom into contact with the hingedly supported load carrier frame above the level of the said cross shaft, and coiled springs, confined under compression in the tubular guides and acting against said push rods to urge them forwardly and to yieldingly resist their rearward movement.

5. A combination as recited in claim 2 wherein the said hydraulic means mounted in the steering column to move the carrier frame from upright to reclining position comprises a hydraulic cylinder that is fixed in the steering column, in its longitudinal direction, a piston rod extended therefrom, a pair of sheave wheels mounted at opposite sides of the cylinder, a sheave wheel at the outer end of the piston rod and a cable extended across the last mentioned sheave wheel, with opposite end portions extended therefrom and under the paired sheave wheels and thence extended therefrom to the tiltable frame and attached thereto substantially above its supporting shaft.

RODNEY JACKSON.

References Cited in the file of this patent

UNITED STATES PATENTS

| Number | Name | Date |
|---|---|---|
| 1,878,994 | Abbe | Sept. 27, 1932 |
| 2,377,389 | Waters | June 5, 1945 |
| 2,475,367 | Avery | July 5, 1949 |
| 2,536,151 | Backofen et al. | Jan. 2, 1951 |
| 2,561,896 | Weiss | July 24, 1951 |
| 2,571,550 | Ehmann | Oct. 16, 1951 |